United States Patent
Bakis et al.

(10) Patent No.: US 10,915,588 B2
(45) Date of Patent: Feb. 9, 2021

(54) IMPLICIT DIALOG APPROACH OPERATING A CONVERSATIONAL ACCESS INTERFACE TO WEB CONTENT

(71) Applicant: International Business Machines Corporation, Armonk, NY (US)

(72) Inventors: Raimo Bakis, Briarcliff Manor, NY (US); Song Feng, New York, NY (US); Jatin Ganhotra, White Plains, NY (US); Chulaka Gunasekara, Yorktown Heights, NY (US); David Nahamoo, Great Neck, NY (US); Lazaros Polymenakos, West Harrison, NY (US); Sunil D Shashidhara, White Plains, NY (US); Cheng Wu, Bellevue, WA (US); Li Zhu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 16/053,726

(22) Filed: Aug. 2, 2018

(65) Prior Publication Data
US 2020/0042649 A1   Feb. 6, 2020

(51) Int. Cl.
*G06F 17/30* (2006.01)
*G06F 16/9535* (2019.01)
*G06N 5/02* (2006.01)
*G10L 15/22* (2006.01)
(Continued)

(52) U.S. Cl.
CPC .... *G06F 16/9535* (2019.01); *G06F 16/90332* (2019.01); *G06F 40/30* (2020.01); *G06N 5/02* (2013.01); *G10L 15/22* (2013.01); *G10L 2015/225* (2013.01)

(58) Field of Classification Search
None
See application file for complete search history.

(56) References Cited

U.S. PATENT DOCUMENTS

| | | |
|---|---|---|
| 7,783,642 B1 | 8/2010 | Feng |
| 8,566,102 B1 | 10/2013 | Bangalore |
| 9,275,641 B1 * | 3/2016 | Gelfenbeyn ............ G06F 40/35 |

(Continued)

OTHER PUBLICATIONS

E. Tulving, D. L. Schacter, et al. Priming and human memory systems.www.sciencemag.org, May 18, 2008.

(Continued)

*Primary Examiner* — Hung D Le
(74) *Attorney, Agent, or Firm* — Jeffrey S LaBaw; Feb R Cabrasawan

(57) ABSTRACT

A method, apparatus and computer program product for presenting a user interface for a conversational system is described. A user input is received in a dialog between a user and the conversational system, the user input in a natural language. A domain trained semantic matcher is used to determine a set of entities and a user intent from the user input. One or more queries is generated to selected ones of a plurality of knowledge sources, the knowledge sources created from domain specific knowledge. The results from the one or more queries are ranked based on domain specific knowledge. A system response is presented in the dialog based on at least a highest ranked result from the plurality of knowledge sources.

20 Claims, 10 Drawing Sheets

(51) Int. Cl.
*G06F 16/9032* (2019.01)
*G06F 40/30* (2020.01)

(56) References Cited

U.S. PATENT DOCUMENTS

| | | | |
|---|---|---|---|
| 9,548,050 B2 | 1/2017 | Gruber | |
| 2003/0137537 A1* | 7/2003 | Guo | G10L 15/1822 |
| | | | 715/751 |
| 2007/0078815 A1* | 4/2007 | Weng | G06F 16/243 |
| 2012/0232885 A1 | 9/2012 | Barbosa | |
| 2012/0245944 A1* | 9/2012 | Gruber | G10L 15/22 |
| | | | 704/270.1 |
| 2012/0296638 A1* | 11/2012 | Patwa | G10L 15/22 |
| | | | 704/9 |
| 2016/0098994 A1* | 4/2016 | Gelfenbeyn | G10L 15/22 |
| | | | 704/9 |
| 2016/0110071 A1 | 4/2016 | Brown | |
| 2016/0259767 A1* | 9/2016 | Gelfenbeyn | G06F 40/35 |
| 2016/0260029 A1* | 9/2016 | Gelfenbeyn | G06F 40/30 |
| 2016/0342702 A1 | 11/2016 | Barve | |
| 2017/0116982 A1* | 4/2017 | Gelfenbeyn | G10L 15/08 |
| 2017/0147554 A1 | 5/2017 | Chen | |
| 2018/0039695 A1 | 2/2018 | Chalabi | |
| 2018/0246877 A1* | 8/2018 | Vainas | G06F 40/30 |
| 2018/0349755 A1* | 12/2018 | Gao | G06N 3/006 |
| 2018/0365567 A1 | 12/2018 | Kolavennu | |
| 2019/0147029 A1 | 5/2019 | Chiu | |
| 2019/0188326 A1* | 6/2019 | Daianu | G06F 9/453 |
| 2019/0228099 A1 | 7/2019 | Bajaj | |
| 2019/0236137 A1 | 8/2019 | Hesketh | |

OTHER PUBLICATIONS

M. Henderson, B. Thomson, and J. D. Williams. The second dialog state tracking challenge. In SIGDIAL Conference, pp. 263-272, 2014.

D. Hakkani-Tür, G. Tür, A. Celikyilmaz, Y.-N. Chen, J. Gao, L. Deng, and Y.-Y. Wang. Multi-domain joint semantic frame parsing using bi-directional rnn-lstm. In Interspeech, pp. 715-719, 2016.

IBM Patents or Patent Applications Treated as Related.

* cited by examiner

IMPLICIT DIALOG APPROACH OPERATING A CONVERSATIONAL ACCESS INTERFACE TO WEB CONTENT

BACKGROUND OF THE INVENTION

This disclosure relates generally to natural language processing. More particularly, it relates to providing a natural language interface to web content.

It is becoming common for users to encounter applications such as virtual agents and chat bots which provide a natural language interface to web content, apps and channels. These applications provide a written or spoken dialog with a user, assisting with common tasks such as providing answers of frequently asked questions, helping a user complete an online transaction and increasing the accessibility of the web content while interacting with end users in natural languages. Such applications offer great practical value to the organization hosting the web content in reducing the number of human help agents and providing a friendlier interface for the organization.

However, it is a very challenging task to develop an artificial intelligence application which supports natural language based interactions for end users to access web content. One of the greatest challenges is generating dialog flows to guide the conversation of the application. Many commercial chat bots are primarily based on human authored dialog flow, which is costly in time and money to develop. These are retrieval based models which use a repository of predefined responses and some type of heuristic mechanism to pick the correct response. These predefined responses are hand crafted to answers user questions, typically in a narrow subject of interest.

Further improvements in computer aided natural language processing are needed.

BRIEF SUMMARY

According to this disclosure, a method, apparatus and computer program product for presenting a user interface for a conversational system is described. A user input is received in a dialog between a user and the conversational system, the user input in a natural language. A domain trained semantic matcher is used to determine a set of entities and a user intent from the user input. One or more queries is generated to selected ones of a plurality of knowledge sources. The knowledge sources are created from domain specific knowledge. The results from the one or more queries are ranked based on domain specific knowledge. A system response is presented in the dialog based on at least a highest ranked result from the plurality of knowledge sources.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, preferred embodiments of the invention provide a system, method and computer program product for creating a natural language interface enabling users to find and access existing content such as web content. This invention can be used to create a conversational interface for common applications such as virtual agents and chat bots which can be integrated into various devices or channels. The conversational interface is created by an "implicit dialog" process which uses a range of cognitive techniques to detect user intent, translate existing natural language questions into natural language question and answer pairs and inherit the schemas and business related logical knowledge present on the web site. The process creates a natural language conversational overlay based on the current content presentation layer. The overlay is embodied in a knowledge graph as well as other knowledge sources which provides a map for a conversational interface to maximize the probability of returning the correct answer to a user query.

The conversational interface satisfies end user needs by providing answers for such items as frequently asked questions (FAQ) and how to complete tasks in the user interface. It increases the accessibility of web content by allowing users to interact in a natural language. Many commercial chatting services are primarily operated based on human authored dialog flow, which is highly costly in time and money. In contrast to the conventional dialog systems which are based on manually designed dialog flows, the invention's implicit dialog approach, aims to guide the dialog according to the underlying business schema and logic extracted automatically from the original web content with a minimum of human supervision. The schema and logic are used to organize unstructured information which is used to create the conversational interface.

Figure 1:
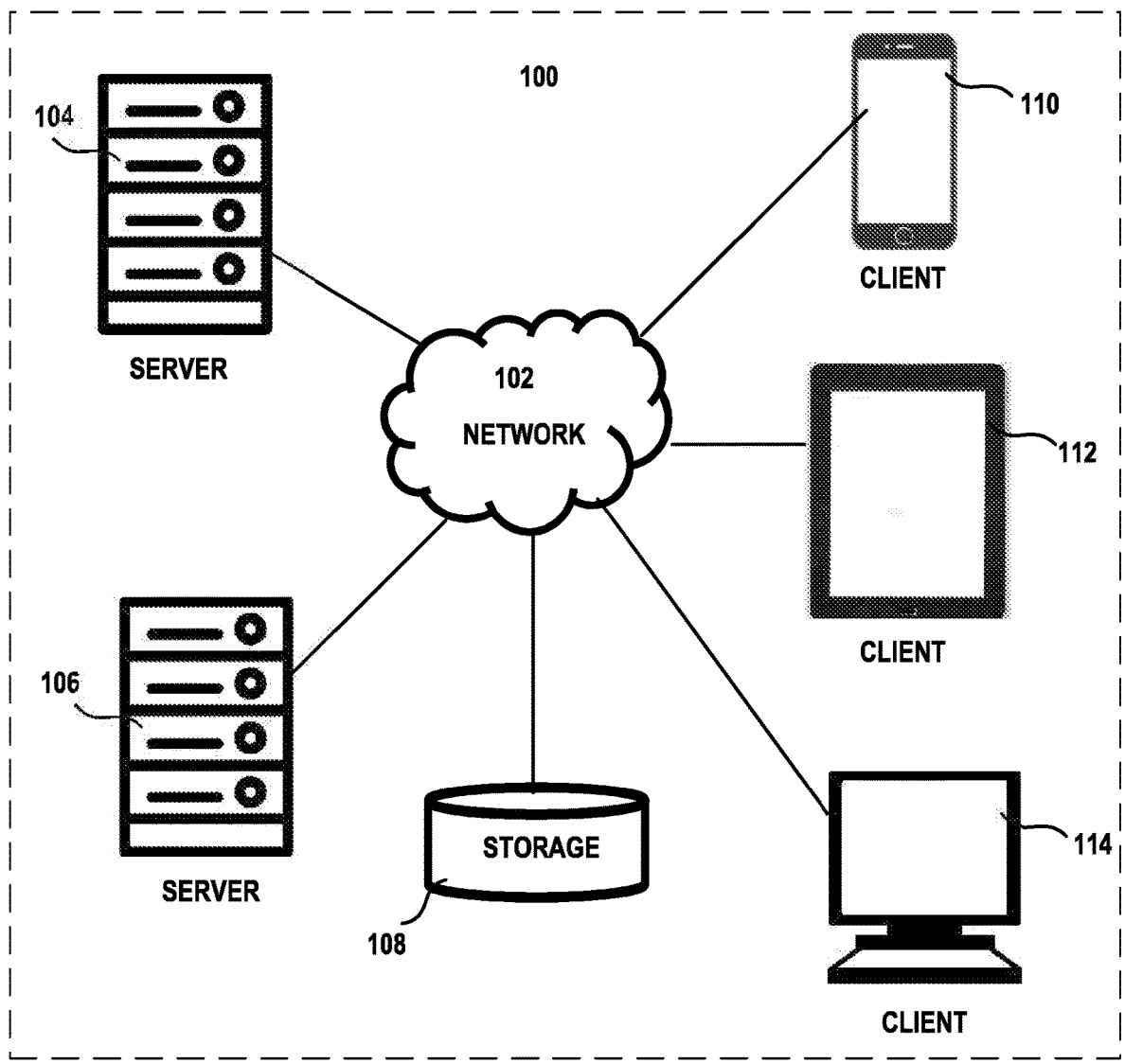
FIG. 1 depicts an exemplary block diagram of a distributed data processing environment in which exemplary aspects of the illustrative embodiments may be implemented.
Figure 2:
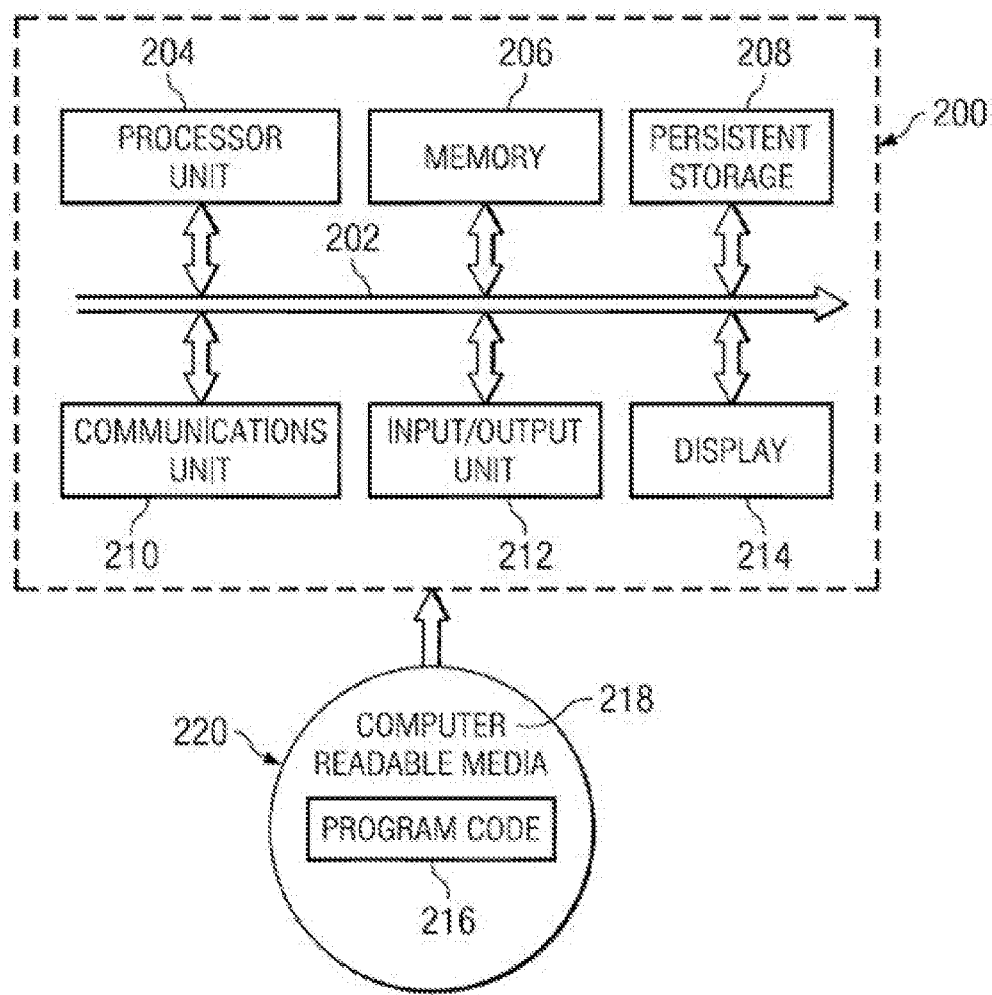
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

Embodiments of the invention contain an Implicit Dialog system which includes the following major modules. A knowledge extraction and integration module extracts knowledge from the web site, or an application associated with the web site. Since the knowledge is in various forms, different extractor type modules are preferably used to extract the different types of knowledge.

In preferred embodiments, prior to further processing, the extracted knowledge is integrated in a standardized format in a domain corpus. In these embodiments, the domain corpus is supplemented by information from other sources, which may be web based sources, in addition to the target web site itself. The information from the other sources is preferably within the subject area for the services provided by the target web site. Where the information is unstructured information, as is often the case with documents or web based information, the business logic and schema are used to organize the unstructured information.

As will be described in greater detail below, a natural language process is used to understand user queries, entities in the web site and their relationships with each other. For example, a semantic matching model using a deep learning process is used in embodiments for word level distributed representations to improve knowledge querying. In preferred embodiments, the semantic matcher is trained using domain specific data, i.e. data related to the tasks of the target web site. In addition to supplementing the corpus with information from other sources during the learning process to configure the conversational interface, the semantic matching model is useful to enable the conversational interface to query multiple knowledge sources and rank the returned responses to better interact with the user during the run-time process. A natural language generation module will generate a response to the user query based on the higher ranked response(s).

Preferred embodiments of the invention are also "self-adaptive". By self-adaptive, the inventors mean that these embodiments learn from prior user interactions, prior retrieved data and conversation logs within the conversational interface.

Preferred embodiments use sequence-to-sequence models to perform deep learning on both the initial corpus and the learning acquired during user interactions with the conversational interface, although other machine learning models are used in other embodiments.

Figure 3:
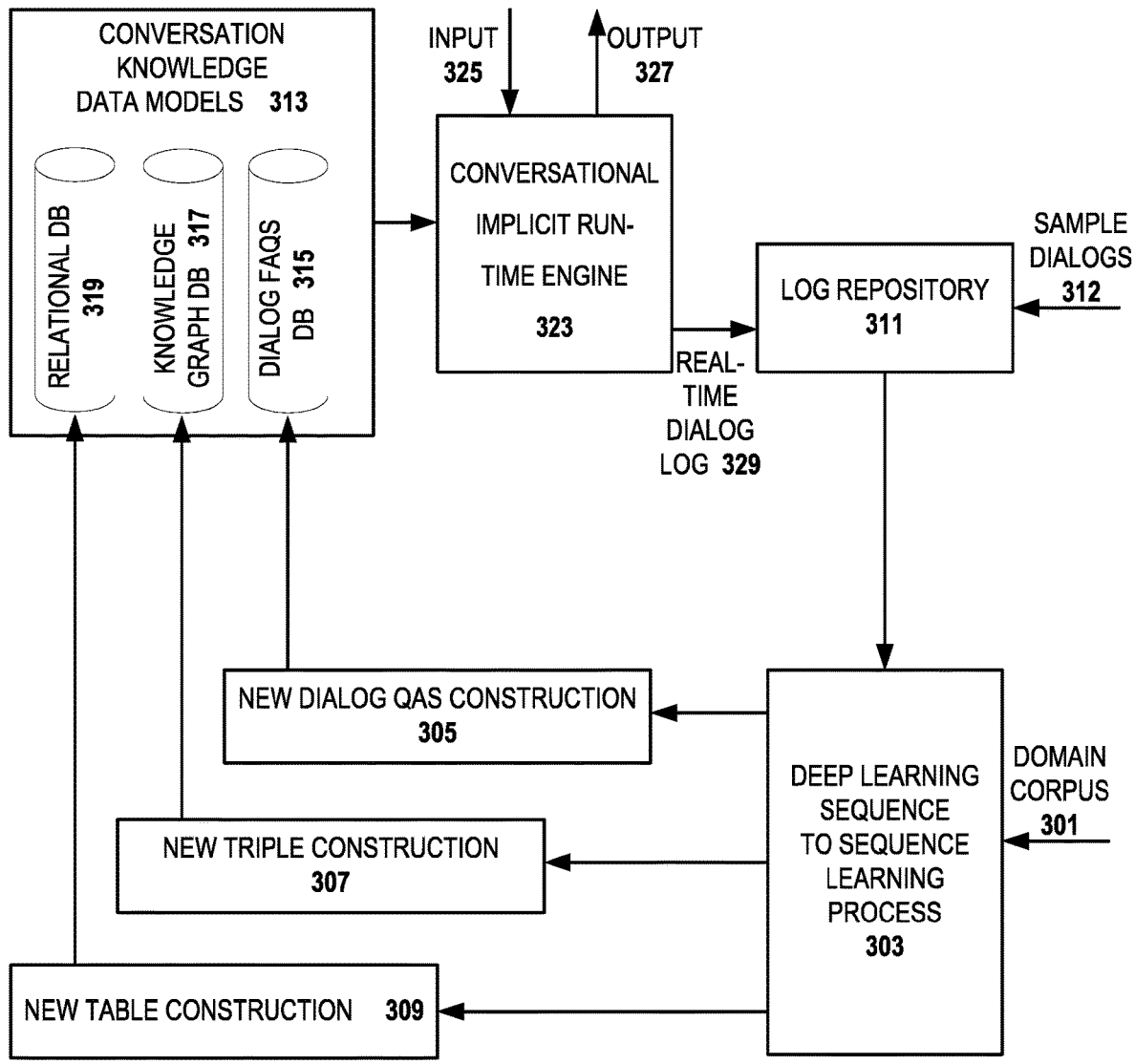
FIG. 3 illustrates an architectural diagram of components in the system which generates the conversational interface according to an embodiment of the invention.

One preferred embodiment of the system which generates the conversational interface is shown in FIG. 3. As shown in the figure, the domain corpus 301 is fed into the deep learning process 303 which in a preferred embodiment is a sequence-to-sequence learning process. The domain corpus 301 is collected by extracting knowledge from the target web site and possibly outside data sources by one or more knowledge extraction and integration modules (not shown). As is mentioned above, since the knowledge takes several forms on the web site, e.g., FAQs, APIs to the web applications, business logic and schemas, in preferred embodiments, the domain corpus is standardized to a consistent format. Other embodiments use multiple domain corpora, each for a different type of knowledge within the domain. The deep learning process 303 uses the domain corpus 301 to provide input to the new dialog question and answer construction module 305, the new triple construction module 307 and the new table construction module 309. Other embodiments use other machine learning processes and have different construction modules which construct different knowledge sources.

In addition to the domain corpus 301, in preferred embodiments of the invention, the deep learning process 303 takes input from the log repository 311. Initially, the log repository contains a set of sample dialogs 312 from the web site (e.g., a set of FAQs) or a set of dialogs prepared by the designers of the conversational interface for some anticipated web site tasks. As the process goes on, the log repository 311 will also contain interaction data, or user conversation logs, between users and the conversational interface.

In preferred embodiments, the knowledge extraction process extracts a plurality of different types of information from the target website, e.g., information present on webpages, API call information, FAQs and so forth. In these preferred embodiments, the information from webpages is extracted by a set of heuristics which are not manually hard-coded for a given website, but allow extraction from any website. Although in other embodiments, hard-coded extraction programs are used. FAQs are extracted from the target website through a set of rules. In different embodiments, the rules can be general or specifically configured for the website. The deep learning process 303 learns from both inputs, the domain corpus 301 and the log repository 311. For example, the deep learning process can learn the information in the domain corpus 301 and combine it with the user logs from the log repository 311 to generate a better system response during runtime.

The deep learning process 303 provides tailored inputs to the new dialog question and answer construction module 305, the new triple construction module 307 and the new table construction module 309. The inputs to the construction modules vary according to the type output desired from the respective construction module. The deep learning (DL) process 303 is shown as one box, but in preferred embodiments, it will have separate sub-components which will be trained separately. For example, one DL component will be trained to generate a better system response given a set of user questions; another DL component will be trained for generating new triples given existing triples and so forth. Each of the construction modules 305-309 provide respective data models for storage in the conversational knowledge data models store 313. The new dialog question and answer construction module 305 provides input to a dialog frequently asked questions (FAQs) database 315. The new triple construction module 307 provides the triple input used to construct a knowledge graph model 317. The new table construction module 309 constructs the tables which will be used to answer the user queries. In preferred embodiments, the tables are stored in a relational database system 319 and the dialog FAQs are stored in a NoSQL database. A NoSQL database provides a mechanism for storage and retrieval of data that is modeled differently than the tabular relations used in relational databases.

The conversional runtime engine 323 interacts with the user, receiving inputs 325 such as natural language questions from the user and provides output 327, e.g., natural language answers. As one component of the runtime 323, a real time log 329 of the dialog between the user and the runtime engine which is sent to the log repository 311. The real time log 329 is sent to the deep learning module 303 so that the conversation knowledge data model 313 can be continually improved from the interactions with the user. Also, if there are changes to the target web site, these are detected so that the knowledge extraction and integration module can update the corpus 301 and then the knowledge databases 315-319. In embodiments of the invention, it also provides a context aware update of the knowledge databases by automatically identifying the changes of the web content on the target web site and examining if the changes affect the knowledge structures and dialog policy of the conversation interface. Information extracted from the website will be tagged with a system date and time, when the information was extracted, processed and added to the knowledge stores 313. The date and time allows it to capture if the information is recent or not. The updates to the corpus 301 will then be reflected in the conversation knowledge data model 313.

One preferred embodiment of the conversation runtime engine 323 is discussed in detail below in association with FIG. 7. Exemplary user interactions with the conversational interface are explained in greater detail below in association with FIG. 8-10.

As is mentioned above, one aspect of embodiments of the invention is the self-adaptive learning process using the conversational flows between the user and the conversational interface in the Implicit Dialog system. The Deep Learning process 303 is used not only in the initial creation process of the resource description framework (RDF) triples, but also in the self-adaptive process using the conversational flow.

The Deep Learning process 303 receives the data from domain specific corpus 301 and also consumes the conversational service 323 run-time dialog logs continuously so that both data sources continually construct a corpus 301 for a conversation flow self-adaptive process. In preferred embodiments, the Deep Learning process 323 learns the conversational flows directly from the data (e.g., pairs of user input and system output). The learning mode can be either or both supervised and unsupervised reinforcement learning. In respective embodiments, a sequence-to-sequence (Seq2Seq) and sequence-to-set (Seq2Set) machine learning models are used. In alternative embodiments, a sequence-to-dialog (Seq2Dialog Act) model is used. However, in yet other embodiments, action planning and dialog management machine learning models are also candidates for the continuous learning from logs and examples. Other machine learning models can be used to provide the function of the deep learning process in alternative embodiments. For example, a simple dialog manager could use a Recurrent Neural Network (RNN) which updates its internal state based on the current dialog state and history.

Since the Implicit Dialog system is a domain-based dialog system, it is possible to associate all entities and user intents with underlining knowledge base schemas. Given the system's run-time data model management and query optimization, user interactions with the system queries to the user can be generated on-the-fly without a predefined template.

In embodiments of the invention, the domain schema and ontology are used to help evaluate query efficiency. With domain schema and ontology, entity parsing and intent detection can be more accurate and reduce ambiguity in query generation. For example, when a user talks about "Ford", it can mean a variety of things, e.g., a person, a company, a car, a movie or a topographical feature. When the system is designed for an insurance domain, the system knows that "Ford" is a car maker from the domain ontology, so when it hears the entity "Ford", the system knows the utterance is referring to the car maker instead of other possible meanings. In this example, when the system generates a query, it knows to connect the car maker field. Using the domain schema and ontology, embodiments of the invention minimize the need to manually write declarative rules for the domain to identify entities and user intents.

In preferred embodiments, a schema-based process is used for natural language query generation. All entities and user intents (from current input and all previous inputs) have schema information (tables, columns, nodes and relations). The system will use all entities with foreign keys related (directly or indirectly) to the user intents to generate queries to search for the user intents. Schema information can be annotated to include customized functions, names and operations so the query generated covers a great variety of intents, not only those limited to direct table columns or nodes. The process of annotation is a well-known function to those skilled in machine learning art.

To optimize user queries, in preferred embodiments, the conversational model is stored in multiple databases, e.g., Dialog FAQ DB 315, Knowledge Graph 317 and Relational DB 319, so that the query execution can be heterogeneous. For example, the system can perform a parallel search in multiple databases to improve performance or a complimentary search in multiple databases to find more related results.

The query is optimized for performance and/or coverage in different embodiments. In these embodiments, user entities are removed or added based on historical research results and the domain ontology is used to enhance the query generation. Generated queries are examined according to the domain schema and ontology to decide how to execute the query. Query execution history provides a quick estimation of search results. The query optimization is novel in terms of performance gain, as prior art search methods used a more static search, resulting in search results which tend to be narrow, inaccurate and slow. With the optimization, the search can automatically (as needed) covers more sources with the latest/complete dialog state either from parallel processing or history caching.

As is mentioned above, embodiments of an Implicit Dialog system are based on the underlying business logic and/or schema extracted from the original web content. For example, for a web site, the web presentation overlay contains the facts and relationships needed for the conversational service. The facts and relationships in the overlay are preferably stored in the Knowledge Base (KB) 313 after extraction. Instead of human authoring used by the prior art, a natural language conversational overlay is created based on the current content presentation layer and the underlying business logic and schema. Where unstructured information from other sources is incorporated, the organizational structure found in the presentation layer, the business logic and/or schema are used to organize the unstructured information. The details of this approach are addressed in greater detail below.

Figure 4:
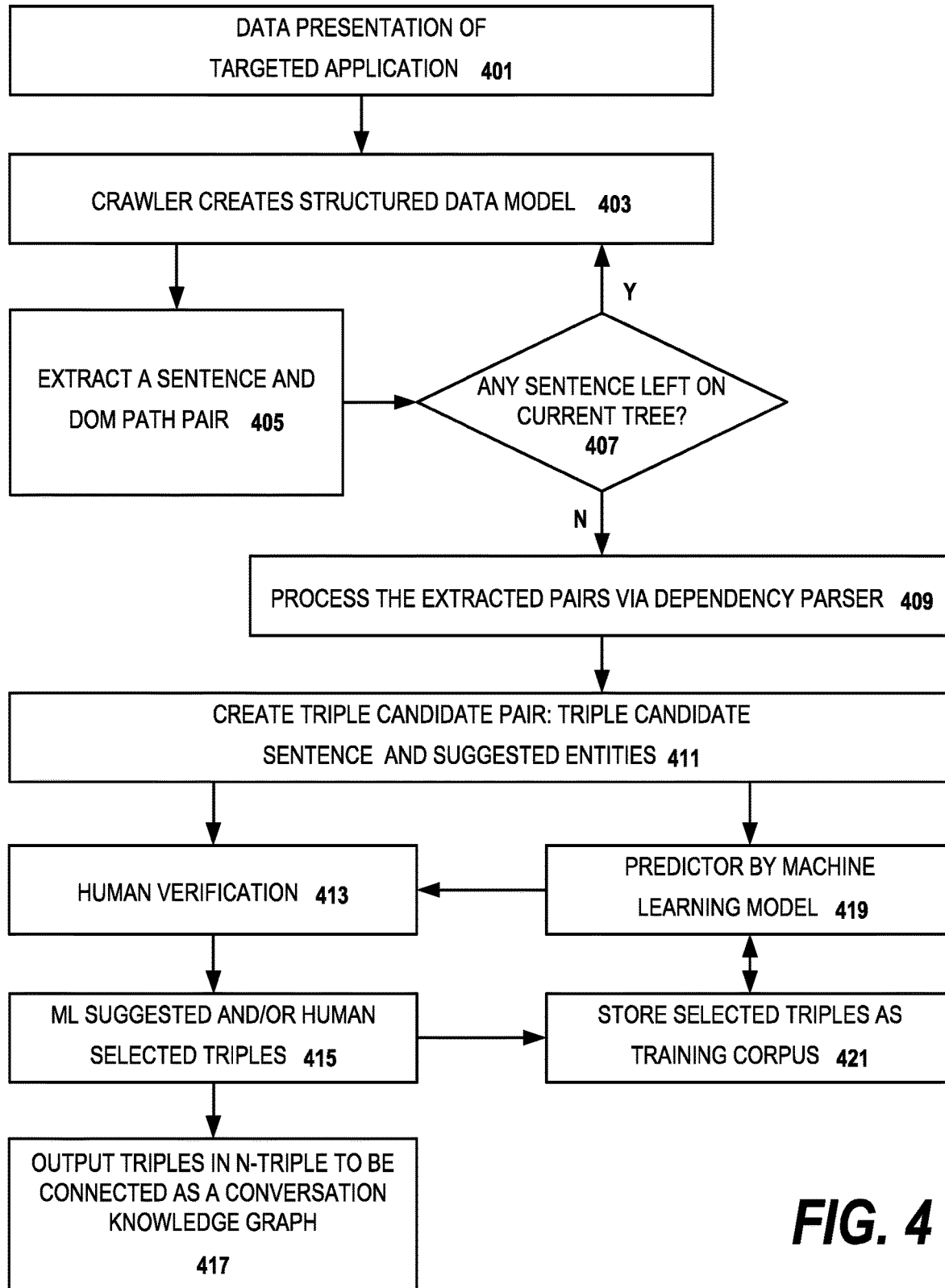
FIG. 4 illustrates a flow diagram of operating the system according to an embodiment of the invention.

FIG. 4 illustrates a flow diagram of creating the databases used in the system according to an embodiment of the invention. In preferred embodiments of the invention, a hybrid approach of triple extractions based on self-learning is used. Data and logic from the web site, e.g., the presentation of a targeted application, the business logic or web site schema, provides the base information for building a conversational interface using the Implicit Dialog process. Because of the variety of information on a typical web site, the data can be extracted in many different formats. Since preferred embodiments of Implicit Dialog process use a knowledge graph to model conversation flows, a resource description framework (RDF) triple is one common data type which is used in embodiments of the invention. An RDF triple contains a subject, predicate and object; the predicate indicates the relationship between the subject and object.

In step 401, the crawler is pointed to the target web site and/or the web application for which the conversational interface is to be developed. The web site will likely contain a set of web pages written in HTML or another web authoring language as well as the underlying business logic of the target application. The crawler, sometimes called a spider, will systematically browse the web site pages and index the information in a structured data model, step 403, for example, as a document object model (DOM) tree. In a DOM tree, each node is a portion of the documents on the web site and the nodes are arranged in a tree structure.

Next, in step 405, the system, e.g., a parser component, extracts the next sentence and DOM path from the structured data model to build the domain corpus. In step 407, the system determines whether there are any more sentences left to extract. The sentence/DOM path pairs continue to be extracted from the tree, until the test in step 407 determines that the last sentence has been extracted from the DOM tree.

In step 409, the extracted sentence/DOM path pairs are processed by a dependency parser. A dependency parser analyzes the grammatical structure of a sentence and establishes the relationships between the elements in the sentence. Typically, the parser will establish the relationship between the "head" words or subjects of the sentence and the words which modify the head words, the objects. In step 411, the output of the dependency parser is used to construct a set of candidate triples. Each candidate triple contains a pair of sentence elements and the relationship between the two elements. For each extracted sentence or data triple, the system introduces a schema driven location index, so that there is no single isolated sentence, nor data triple, but each data element is part of a pair, that is, a data/value, a location/schema or a path/index pair. Thus, each data element is processed as being considered as pair-wise data.

In step 413, both the machine learning suggested triples and the extracted pairs are verified by a human subject matter expert. Both in the human verification process and machine learning based automated process, the schema information from the web site is included by default, so it is called a hybrid process (value and schema). The process of human verification generates a set of human selected triples and/or machine learning derived triples, step 415. This set of triples is output as the qualified triples (truth) to be connected as a conversational knowledge graph, step 417. This set of triples is also used to create the training corpus for using machine learning methods in step 421. As the corpus is used to train the machine learning model in step 419, the machine learning creates its own set of suggested domain specific triples. As mentioned above, the machine learning suggested domain specific triples are verified by the subject matter expert in step 413. This feedback loop provides an automated self-learning process to assist in the creation of the knowledge graph and corpus.

One important feature for an Implicit Dialog system is the capability to extract the schemas and business logical knowledge for a targeted application or service presented in a web site. The presentation of specific business logic information on the web site is intended for assisting end users accomplish tasks on the web site in various ways. The content is usually rich, but is in various forms, that is, the information on the web site is in multiple formats, each of which may need be to be normalized for handling in a knowledge graph. In embodiments of the invention, the information present on the web site is supplemented by information found in domains similar to the targeted domain of the targeted application or service. Where the supplementary information is unstructured its inclusion in the databases is guided by the organization in the databases provided by the business schema or logic. Related concepts to the unstructured information are identified in the databases and then the unstructured information is appropriately (generally proximately) stored.

Figure 5:
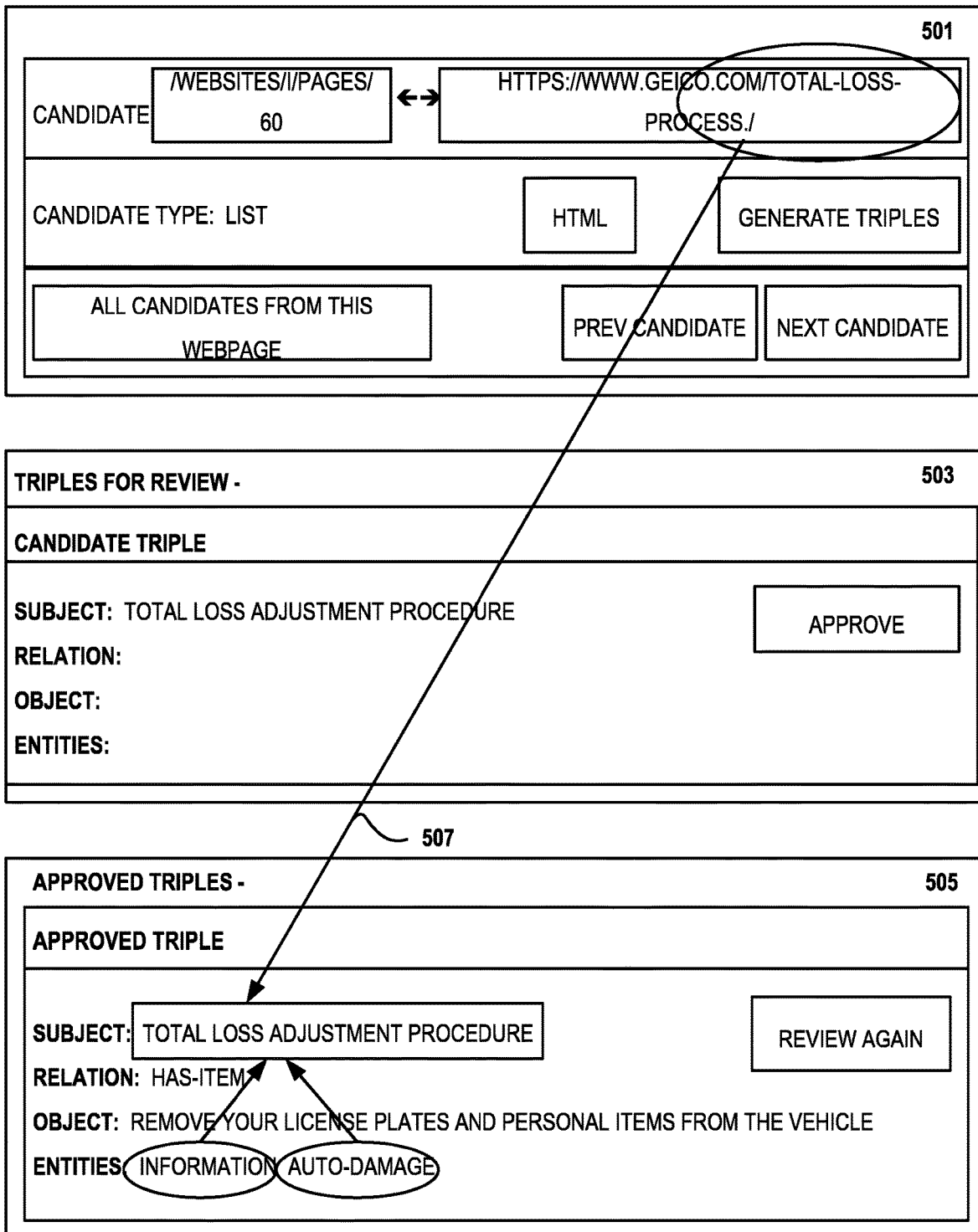
FIG. 5 is a diagram of an interface extracting a triple from a web page according to an embodiment of the invention.

Another aspect of embodiments of the invention is for a subject matter expert to verify the extracted triples from the web site. FIG. 5 shows one example interface in which the expert provides feedback on the data (facts, triples) extracted from the website. This interface shows how the extracted data relates to a schema path.

The schema path is derived from the web URLs for the website and web-schema nodes are generated from the schema paths. For every data item/triple, when the triple is reviewed, the triple is automatically shown connected to the appropriate web-schema node. In FIG. 5, the top panel 501 shows the web site and URL from which information is being extracted. In this embodiment, the panel 501 has controls for displaying the HTML, the generated candidate triplets and for navigating between candidate triplets. The middle panel 503 presents a list of triples for review, though only the first triple is shown for ease in illustration. The panel has the triple <" " (subject), ""relationship, ""(object)> and a control for approving the triple. An example triple is

```
<uri://abc.kbc.abc.research/terminal/Features-of-boat-towing-service>
<uri://abc.kbc.abc.research/relation/has-item>
"No out-of-pocket expenses"
```

The lower panel 505 shows the triple <"total loss adjustment procedure" (subject), "has-item" (relationship), "Remove your license plates and personal items from the vehicle" (object)> was extracted from the webpage. As illustrated, the user focus is on the approved triple, so the link 507 is shown connecting the URL to the approved triple. Other means of highlighting related elements in a user interface are known to the art.

There are several ways in which embodiments of the invention extract knowledge from the web site to build the conversational interface.

First, the Implicit Dialog process inherits the existing schema and business logic by preserving the existing web schemas (HTML tag paths, DOM tree) by extracting each piece of data (like facts or triples) and associating the extracted data with a schema path automatically. The preserved information is stored in a natural language conversation overlay for the web site. In preferred embodiments, the Implicit Dialog process stores the overlay in a knowledge graph; other databases are used to store information extracted from the web sites in different manners. The knowledge graph serves as the natural language conversation overlay and is used by the conversation interface to answer user questions.

Second, when providing a natural language conversation overlay on transaction type applications, such as online form filling, embodiments of the invention use the business logic provided by the web site controlled via the application back-end via API. The Implicit Dialog process leverages the data structure (such as form data) provided by application back-end as an important part of a conversational schema. For certain use cases, a customer needs to fill out his/her details in a web-form to get the required information. For instance, for an insurance quote, a customer would need to provide information about his car model/make, year of purchase and so forth to obtain information about a quote. Through the conversational interface, embodiments of the invention provide the ability to provide this information directly in the chat window and return the information requested. This helps in better customer engagement as the customer does not need to search for these forms.

Third, if dialog data is provided in the web site through tables or structured formats, the data structure itself, e.g., table names, column names and tags, will be extracted and used as part of the conversational schema for the interface. Various businesses use relational databases or other structured formats for their day-to-day needs such as inventory management and personnel management. These structured data sources have a wealth of information which can be used for answering user questions through the conversational interface. Embodiments of the invention parse the schema and the content in the structured data source for information useful to the conversational interface to provide answers to user queries. For example, in embodiments of the invention, there are two kinds of common table information. First, the tables contain information which is present on a webpage in HTML, and second, the database tables contain information shared by a client, i.e. client information. For the HTML tables, information extraction can be done by writing a set of rules specific to each table and converting the information to a database format. The database tables containing client information do not require any extraction as they are already structured and allow for data access by SQL queries.

These sources of information, inherited schemas and business logic, the back-end API and table or other structured data, are used to build the conversational interface in preferred embodiments of the invention. Automated techniques are used to quickly build and scale out respective interfaces for different web sites and target applications. Using different sources of information allows the completed conversational interface to provide the correct response to a given user query. Where unstructured information from domain sources augment the information retrieve the web site or we application, the information is placed in the structure established from the web site source. For example, the deep learning will establish that new concepts are related to those already stored the knowledge base. The new concepts from the domain sources will be inserted as nodes in the knowledge base with edges storing their relationships with existing nodes.

Preferred embodiments of the invention use semantic matching for the conversational dialog with the user as the user input is in natural language format. The conversational flows are modelled via either as knowledge graph or as tables in the relational database. The conversational flows are generally executed via some type of query languages, such SQL, SPARQL, etc. so all the entities extracted from user natural language input are mapped to a finite number of searchable entities, relations, and attribute variables.

In preferred embodiments, a semantic matching function is employed in the Implicit Dialog system is based on Deep Learning process, where the words or phrases (entities and relationships) from user natural language input are mapped to word embedding vectors of searchable variables in both the knowledge graph database and the relational database in a low-dimensional space. In embodiments of the invention, the semantic matcher is machine trained using domain dependent training data. This domain dependent training allows the semantic matcher to better understand user input and map it to specific nodes in the knowledge sources created for the conversational interface. As used in the disclosure, a low-dimensional space uses word vectors in neural networks for distributed word representations. This is also known as a word embedding model, e.g. word2vec, Glove. Using such neural networks, the system can represent each word by a set of numbers. For example, the vector size may be 200. Each word is represented by a set of 200 float numbers, which capture the meaning of the word, its relationship with other nearby words and other features.

Two general implementations of semantic matching functions are used in alternative embodiments of the invention: a) pure word embedding vector matching, the input is a list of extracted entities, the output is a set of searchable variables which can be used to construct queries; and b) semantic parser approach which maps user input directly to a graph branch, graph neighborhood or a logic form defined in the data models. However, those skilled in the art would use other semantic matching functions in other implementations of the invention.

For a conversational system, one of the key challenges is how to model the conversation flows. In the Implicit Dialog system, the conversational flows are modelled through a dynamic logic presentation instead of static conversational rules pre-authorized by a human.

In preferred embodiments of the invention, the dynamic logic presentation of conversation flow is stored in a plurality of different data structures, such as knowledge graphs, SQL tables, indexed question answer (QA) pairs in a No-SQL store and client back-end transaction logic via API calls. The dynamic logic presentation (dynamic logic form) is concept driven and fully connected across all different data models through semantic meaning and query execution. The dynamic logic presentation, essentially means that the next system response is generated dynamically and is not manually hard-coded. The inventors call the invention 'concept-driven and fully-connected' meaning that the generation of the next response from the system can be from any of (or more than one of) the information sources (e.g., the knowledge graph, SQL table, QA pair DB) and the generation is based on the current user query.

Figure 6:
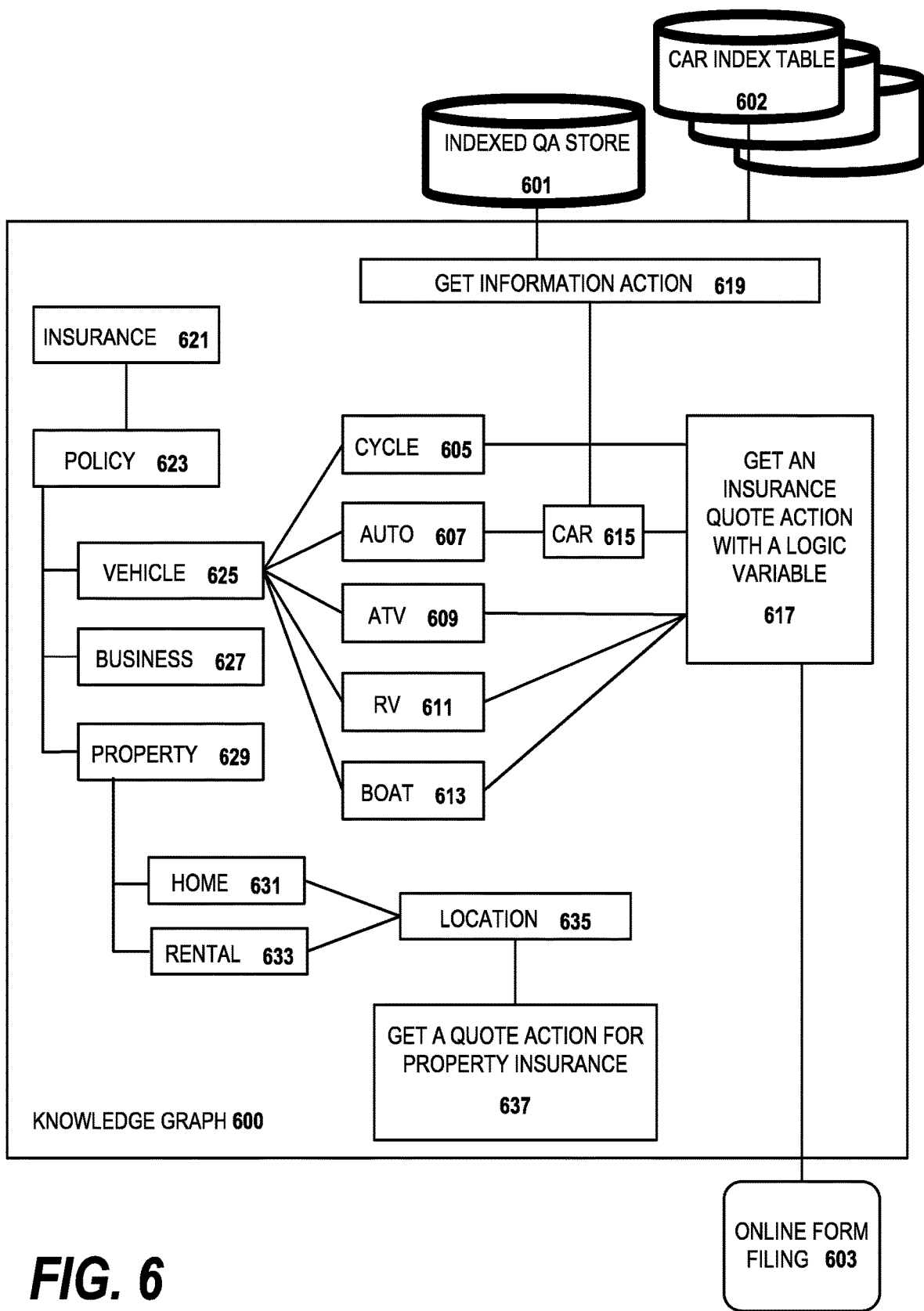
FIG. 6 is a diagram of a knowledge graph constructed according to an embodiment of the invention.

FIG. 6 is a diagram of a knowledge graph constructed according to an embodiment of the invention. In the example shown, an insurance web site has been parsed and stored in a plurality of databases according to an embodiment of the conversational interface. In the illustrative embodiment, the dynamic logic presentation is of an auto insurance task from a web site, however, embodiments of the invention can be used to perform any common web site task. The presentation is supported by four different databases, the Knowledge graph DB 600, the No-SQL DB 601, SQL DB 602, and the online form filling DB 603. In this embodiment, the knowledge graph DB 600 is an RDF graph model which contains nodes for a conversational schema. The No-SQL DB stores conversational information such as relevant answers and information on auto insurance. The SQL DB 602 contains car information such as the car value, repair costs and depreciation schedule in a relational database format. The online form filling 603 is used to aid users for any transaction actions as applicable for the desired task on the auto insurance web site. Multiple databases are illustrated; in a preferred embodiment, each of the databases primarily supports a given web site task, but can be queried to provide the best system response to a user query for a different task. For example, if a user query cannot be fulfilled in the primary database designated for the task, additional searches are made in the other DBs to provide the system response.

Within the knowledge base, there are a plurality of nodes, each of which represent an RDF node for entities which are relevant for the auto insurance task. So in conversing with the user, the conversational interface would start at the root node for an insurance question, node 621. As the conversation with the user progresses, it develops that the user wants a policy, so the system traverses to node 623, and that of the policies offered, he wants a vehicle policy, node 625. As the conversation progresses, the conversational interface will parse the natural language meaning of the users' questions to navigate between the nodes. At each node, if not provided by the knowledge base, the system will retrieve the appropriate information from the No-SQL DB 601 and SQL DB 602. A second user might want an insurance policy for a rental home. So the conversational interface would progress down the insurance 621, policy 623, property 629, home 631, rental 633, location 635 node path. A complete knowledge base 600 for the insurance web site would have many more nodes in the knowledge graph. For ease in illustration, only a few are illustrated.

Embodiments of the conversational interface access the logic presentation by using one of two approaches in preferred embodiments. In a first access approach, the interface accesses the dynamic logic presentation via semantic word embedding only. First, the interface extracts the entity (subject, object) and relationship to the natural language user input. Next, a semantic matcher is applied to the extracted entities and relationships to construct the pairs and the RDF triples. Next, the conversational interface system constructs queries against the whole logic presentation, that is, individual queries are formatted correctly for each of the Knowledge graph DB, SQL DB and No-SQL DB. Next, the results from the queries are evaluated to determine a next system dialog action based on a ranking of the respective results. For example, the next system action can be an information action such as playing the retrieved answer from the QA store back to the user. Or, the next system action could be a transaction action, so the system would move to an on-line form filling dialog. If the results were inconclusive, i.e. no action rose above a threshold confidence level, effectively the conversational interface did not understand the user, so a disambiguation action is taken. The system asks a question, based on the relative neighborhood in the knowledge graph to construct a prompt (question) via a template.

In other embodiments, the conversational interface uses an access approach to the dynamic logic presentation via a semantic parser. The semantic parser is used to parse the user input. The output of the parser is used to map the meaning of the user input to a relative neighborhood in the knowledge graph, a relational DB table or a QA Inference returned results. The role of the semantic parser is to assist in determining the next best possible system action. The semantic parser does not generate the next system response itself, however. For example, if the semantic parser maps the user input to a specific node in the knowledge graph, or to a specific value in the DB table, then the next action will be an information action (i.e. the next response will be information shared with the user). However, if the semantic parser cannot map the user input to a specific node in the knowledge graph (or to a specific entry in the DB table), then a disambiguation action will be performed. That is, the next response will be a set of options to confirm user choice, as the information given by the user was not enough. As above, the action can be an information action, a transaction action or a disambiguation action. However, in alternative embodiments, other access processes are used. In embodiments of the invention, the system dialog action is chosen from a set of possible system responses such as an information prompt, an action URL, an on-line form killing action, a template action (sub-graph, or DB table structure) or a disambiguation prompt.

Figure 7:
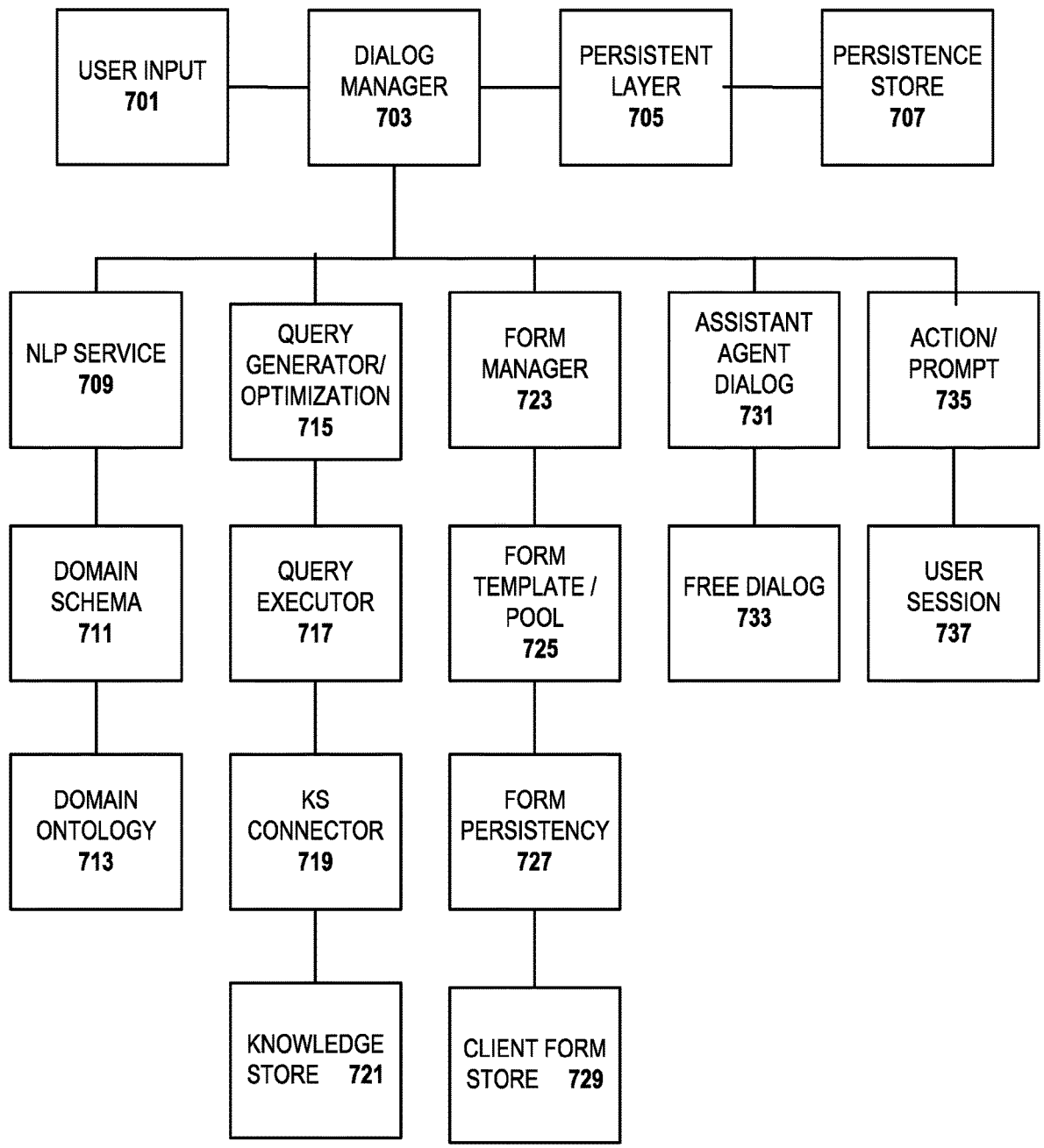
FIG. 7 is an architectural diagram of implicit dialog interpreter runtime components in one embodiment of the invention.

FIG. 7 is an architectural diagram of the implicit dialog runtime components in one embodiment of the invention. The user input module 701 is preferably a natural language based service with which the user can speak or type natural language questions and answers. The user input module 701 also interacts with the other components of the conversational interface. The module 701 is supplemented with a graphical user interface in embodiments of the invention. It can be integrated into the dialog manager 703 or be an independent web service module based on IBM Bluemix Voyager, UoM Lucida, or other web service technology. One skilled in the art that other technologies can be used in other implementations of the user interface.

The Dialog Manager component 703, in the illustrative embodiment, is the component which performs the configuration tasks as well as the integration with the other components of the conversational interface. Thus, for example, in a given user session, the dialog manager 703 defines the dialog type, the knowledge store configuration, the natural language processing (NLP) configuration, the persistence parameters and other system parameters being used in the user session. Dialog manager 703 defines the dialog flows and it also provides configuration to other components to work. In preferred embodiments, the configuration information is contained in a configuration JSON file. The dialog manager 703 reads the configuration file in and uses it to configure the dialog components and flow. For example, a dialog manager 703 reads in the configuration file for the persistent layer 705 and so the persistent layer module then knows how and where information about persistence is stored in store 707 to do persistence. The dialog manager 703 manages the form template pool as well as manages the individual sessions with respective users.

In preferred embodiments, the dialog manager 703 uses a Restful/API to interface with the other components in the conversational interface. Thus, for example, it takes inputs from the user input layer 701 and sends them to the NLP Service 709, the query generator 715 and/or the form manager 723 as appropriate.

The persistent layer 705 is used to maintain a persistent state in the user session. In a preferred embodiment, the layer 705 keeps the current dialog log in the user session. In preferred embodiments, the current dialog log can be used to correctly interpret a current user natural language input. It is also used to keep the dialog state, i.e. whether it is the user or system which responded last in the dialog session. If an interactive form is being used to perform the desired task, the form state is also stored by the persistent layer 705. The persistence store 707 is used to keep dialog state, dialog history, query/result history and so on. It also keeps the dialog information in case the dialog server is out of order.

The natural language processing (NLP) Service 709 is used by the conversational interface components to provide NLP tasks such as semantic matching of a natural language user input to determine the entities and user intent. In embodiments of the invention, the NLP service 709 is domain trained for the specific web site, e.g., an insurance web site. In preferred embodiments, it contains the semantic matcher. In embodiments of the invention, where the dialog manager 703 uses a Restful API, the other components such as the NLP service 709 use a Restful API also. The NLP service 709 has a domain schema component 711 which is uses for schema extraction and offline schema annotation and a domain ontology component 713 which performs offline ontology extraction.

The Query Generator/Optimization component 715 generates queries, e.g., a standard (intermediate) query from searchable entities and user intent extracted by the NLP service 709. It includes a Query Executor component 717 which generates queries for specific knowledge stores, e.g., the knowledge graph, or the rational database. The Query Executor component 717 configures the generated query for execution, executes the queries and handles the result process. The knowledge store connector 719 handles any communication tasks with a knowledge store 721. Although a single connector and knowledge store are shown in preferred embodiments of the invention, there are separate connectors for each of the knowledge stores, i.e. the relational database, the knowledge graph and the FAQ store as well as any other knowledge store in the particular implementation of the invention.

The Form Manager component 723 handles the form related tasks for the conversational interface. For example, the form manager 723 loads form template from the appropriate schema and manages the user form filling flow. Other tasks performed by the form manager 723 in embodiments of the invention include loading the form configuration process as well as managing the form state. The Form Template/Pool 725 is a sub component of the form manager 723 which handles the form structure, the dialog state and form filling state as the system interacts with the user. The form persistency component 727 is another sub-component of the form manager 723 which stores a current form state. Persistent layer component 705 is responsible for persistence of whole dialog system, possibly many dialog sessions. The Form Persistency component 727 is used to keep track of the form filling process. In embodiments of the invention, a new instance initialized for a new dialog session. It is used to store the answers for a form and so eventually a completely filled form can be sent to a target destination like a website. The Client Form Store 729 stores the unfilled and filled out forms from the users.

The Assistant Agent Dialog component 731 and the Free Dialog components 733 handle different types of dialog for the conversational interface. The Assistant Agent Dialog component 731 will handle user questions specific to the task or goal (e.g., helping a user with insurance problems, helping a user with queries). The Free Dialog component 733 will handle all other questions outside the task, e.g., social nicety responses and other general questions, which are not relevant to the task or goal.

The Action/Prompt component 735 handles the conversation interface interaction with the user. It provides system actions such as a form filling prompt, an answer to a user natural language question and other system actions. It manages aspects of the user session 737 such as the entities and user intents extracted from a particular natural language user dialog. In embodiments of the invention, the user session is tracked by a dialog ID. Other aspects of the current user session such as form state, dialog state and a dialog log can be tracked by the dialog ID.

Figure 8:
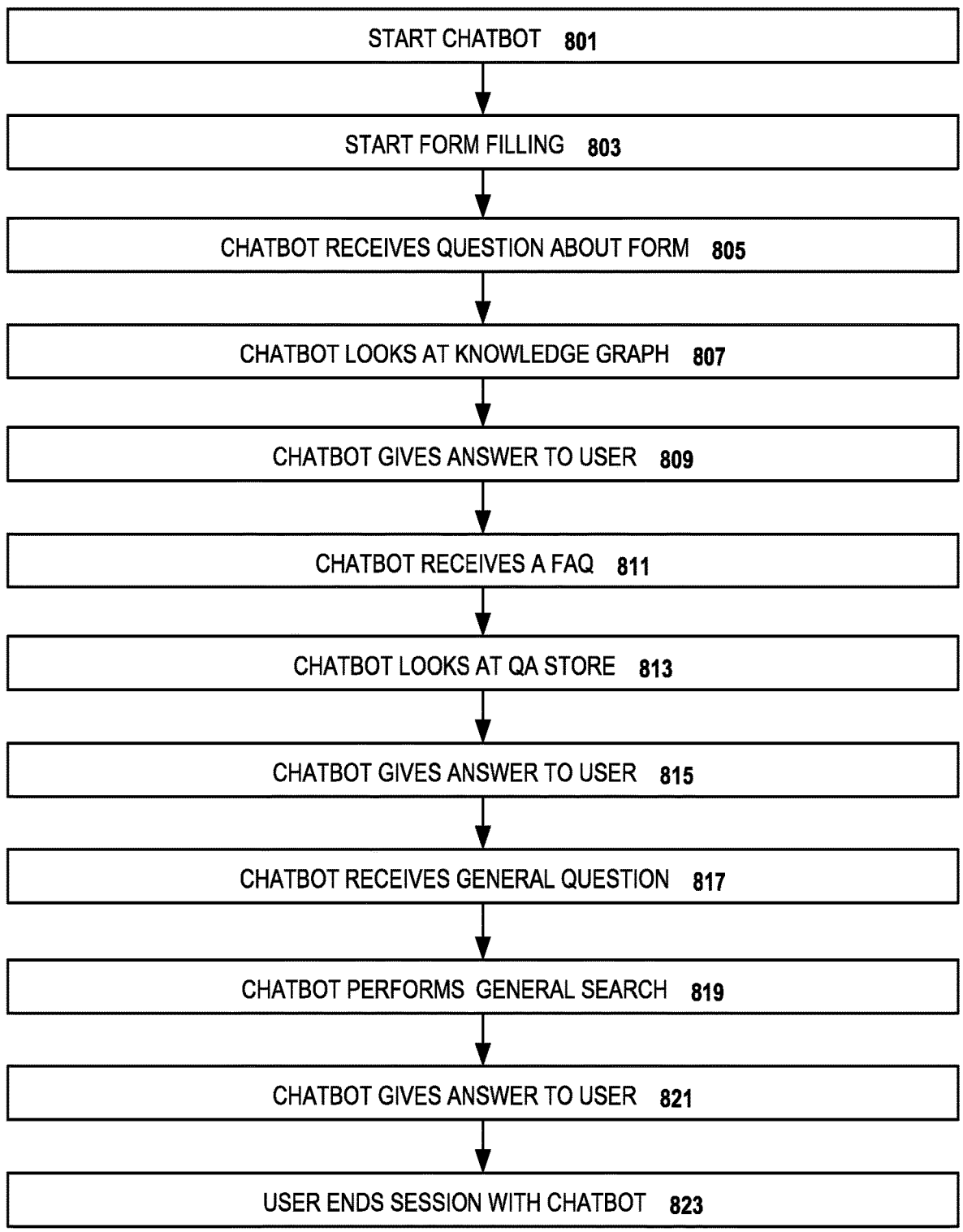
FIG. 8 is a flow diagram of user interaction with a conversational interface created according to an embodiment of the invention.

FIG. 8 is a flow diagram of user interaction with a conversational interface created according to an embodiment of the invention from the user perspective. As an example conversational interface, a chat bot is used in this example. The process begins with the user interactions with the web site and his request to start the chat bot, step 801. In particular, the user wants to apply for car insurance. The user either brings up the form filling application, or in response to a natural language query from the chat bot, a user response indicates that the user wants to apply for insurance (and according to the web site process must bring up the form), the chat bot brings up the form in step 803. In step 805, the chat bot receives a question about the form from the user, e.g., how a particular field needs to be filled out. In response, the chat bot looks at the knowledge graph, step 807. The knowledge graph as described above is derived from schemas and business related logical knowledge on the web site. Based on the information in the knowledge graph, the chat bot gives an answer to the user, step 809. Thus, using the information in the knowledge graph, the answer could be derived from the choices for which the underlying business logic is written from the original target web site. The user interaction concerning the form continues until the form is completed.

In step 811, the chat bot receives a question from the user, perhaps on a different insurance topic, which happens to be a frequently asked question (FAQ) from the original web site. The chat bot looks at the QA store for the answer, step 813. As is mentioned above, the QA store is a question-answer machine learning system in preferred embodiments of the invention. Once the QA store returns the answer to the chat bot, the chat bot in turn gives the answer in a natural language response to the user in step 815.

Next, suppose the chat bot receives a general question, step 817, for which the chat bot does not have an indicated source of information among the databases created with the conversational interface. In embodiments of the invention, the chat bot has access to resources on the Internet and performs a general search using the available commercial search engines, step 819. The chat bot gives the answer to the user in step 821. The answer from the general search is in some embodiments simply the answer returned by a default or designated search engine. In other embodiments, the answers returned by the search engine(s) are evaluated by the trained machine learning models to select the best answer for the domain. In embodiments of the invention, the returned search results are also passed to the deep learning feedback mechanism described above for incorporation into one or more of the databases in the conversational interface.

Once satisfied with the interactions with the conversational interface, the user ends session with chat bot, step 823.

Figure 9:
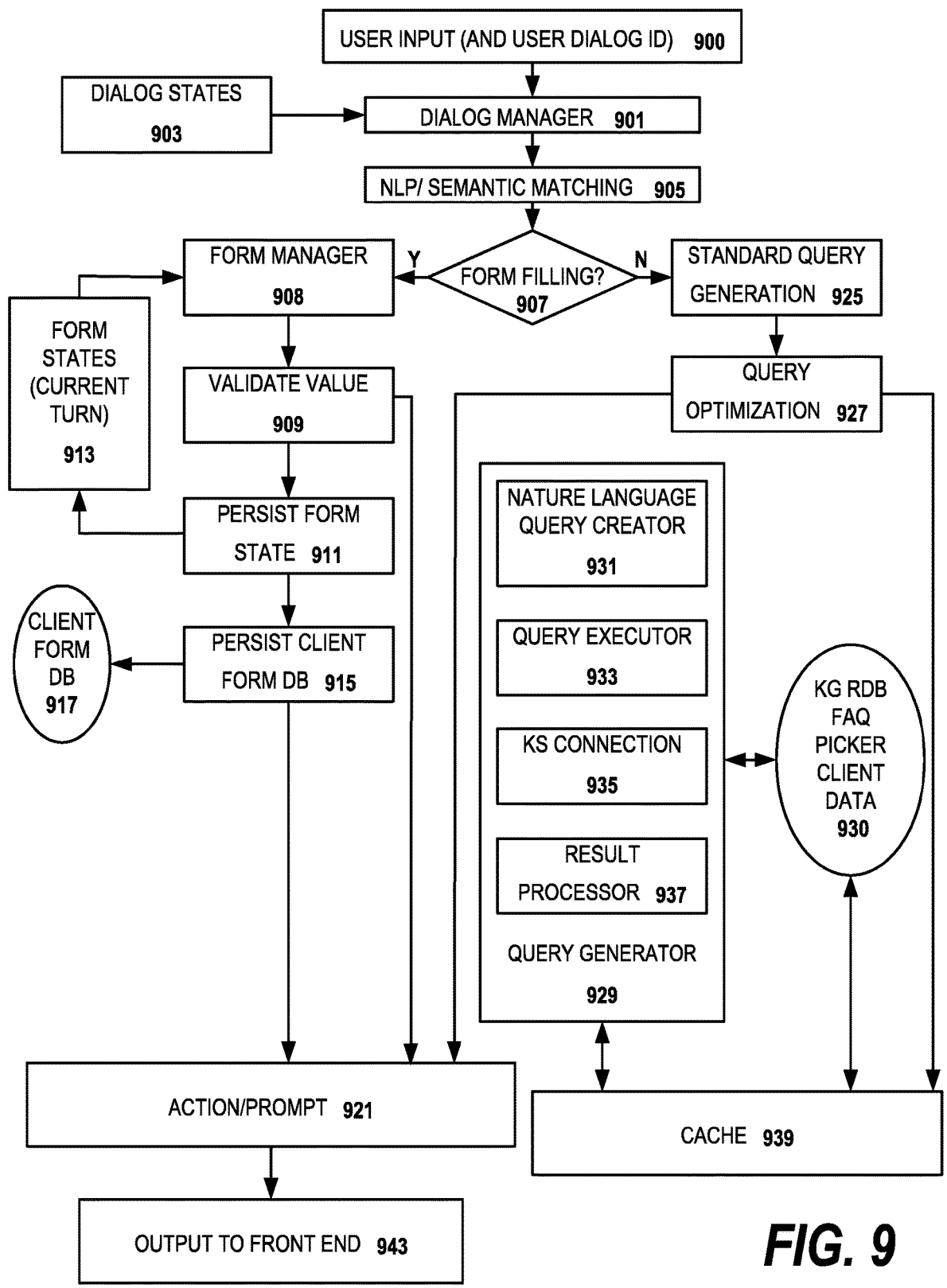
FIG. 9 is a flow diagram of user interaction with a conversational interface with a focus on form filing and describes the runtime flow according to an embodiment of the invention.

FIG. 9 is a flow diagram of user interaction with a conversational interface with a focus on form filing and describes the runtime flow according to an embodiment of the invention.

Consider the following dialog between the user and the conversational interface:

User: I want to buy insurance.
System: What kind of insurance? Business, Vehicle or Homeowner?
User: I want vehicle insurance.
System: What kind of vehicle insurance: Auto, Boat or Motorcycle?
User: Auto.
System: You can use the link to get quote on our web site or you can use our chat to get quote. Do you want to use chat?
User: Yes.
System: Let's start an Auto quotation, what is your first name?
User: John
System: What is your last name?
User: Very interesting
System: I don't understand. What is your last name?
User: Smith
System: What is your email address?
User: Why do you need my email address?
System: For electronic communication and identification. What is your email address?
User: johns@abc.com
System: What is your income range?
1) 0-10000 dollars per year; 2) 10001-50000 dollars per year; 3) 50001-100000 dollars per year
User: 2
System: What is your age?
User: Is there discount for older people?
System: There are mature discounts. What is your age? . . . .

As shown in FIG. 9, in one preferred embodiment, each of the user inputs is processed through the left or right side of the flow diagram. The user input is tagged with the user dialog id, step 900, and input to the dialog manager component of the conversational interface, step 901. The dialog manager retrieves the current dialog state for the user from the persistent layer using the dialog ID. The dialog manager calls the NLP service for a semantic matching operation to determine the meaning of the user input. The decision in step 907 determines whether the user input is a form filling operation. If so, the user input, as interpreted by the NLP service is passed to the Form Manager component in step 908.

Typically, if the user input is a form filling input, there will be a field value transmitted as part of the user input. In step 909, the form manager validates the value of the parameter in the user input. If it is an invalid value, the process proceeds to prompt the user that the value given was not one that could be used in the form (step 921). If the Value was validated, the form manager keeps the value and inputs it into the form in the valid field. The form state is persisted in step 911 with the persistent layer. Also, the dialog state with the user is updated (persisted with the persistent layer) to indicate that this field is completed, and so the next dialog for the next field should be output, step 913.

The form manager persists, step 915, and updates the client form DB storing data as needed, step 917. The form manager then proceeds to the next prompt for the next field in the form (step 921).

However, if the user input was not a form filling input, the process proceeds to the right side of the flow diagram. The conversational interface uses the searchable entities and user intent extracted from the user input by the NLP service to perform a standard query generation, step 925, which produces an intermediate level query.

The intermediate query is passed to the query optimization process in step 927. As part of the optimization process, this step retrieves the previous system response result from the cache for context. The previous result is used to generate a standard query which is fed to the NLP service for further optimization. In embodiments of the invention, the system has different data stores (e.g., relational DB, knowledge graph, legacy database, FAQ picker, client data) and each of them has its own query language, a standard intermediate query is used and converted to individual queries which are then executed against specific data stores.

The query generator, in step 929 uses its components to further optimize the query to each of the knowledge stores 930 for information on how to respond to the user. The natural language query creator 931 generates a standard intermediate query from the searchable entities and the user intent extracted by the NLP service. The query executor 933 generates queries with the specific syntax needed for the particular knowledge store. The knowledge store connection 935 handles the actual connection with the knowledge stores according to the appropriate protocol, sending queries and retrieving the results from the knowledge stores.

Since in preferred embodiments of the invention, similar queries can be sent to multiple knowledge sources, the result processor 937 is used to rank the confidence levels of the results from each knowledge store. For example, the result from the knowledge graph may have a higher confidence level than the result returned from the FAQ picker. Alternatively, the system response to the user may require information from multiple knowledge sources, so the results from each of the knowledge sources may be evaluated separately. For example, the result having the highest confidence level from the knowledge graph may be used as part of the system response, while the result from the relational database having the highest confidence level is used as another part of the user response. Once created, the new system response result is generated and stored in the cache, step 939 and sent to action/prompt step 921 for replay to the user via the conversational interface.

Whether the new system response is a form filling prompt to the user generated by the left side of the flow diagram, or a new natural language response generated by the right side of the diagram, it is output to the front end interface which interacts with the user in step 943.

As is implied by the steps discussed above, the natural language (NL) query creator 931, may generate one or more queries to each of the knowledge stores as is appropriate to gather information for the system response to the user input. That is, the NL query creator 931 may generate a separate relational database (SQL) query, a query based on the RDF triples to the knowledge graph, a FAQ picker query as well as other queries, e.g., to Internet search engines, all in response to a single user input.

In addition to the system responses, the cache 939 can be used to store a current ontology and schema for the domain. If the ontology for the domain is provided, it can be used for query generation. The ontology/schema contains valuable information about different concepts in the domain, their various properties and their relations with other concepts (a concept can also be referred to as an entity). Given this additional information, the query generator will be able to produce better queries for retrieving information from the knowledge graph and the database accordingly.

Figure 10:
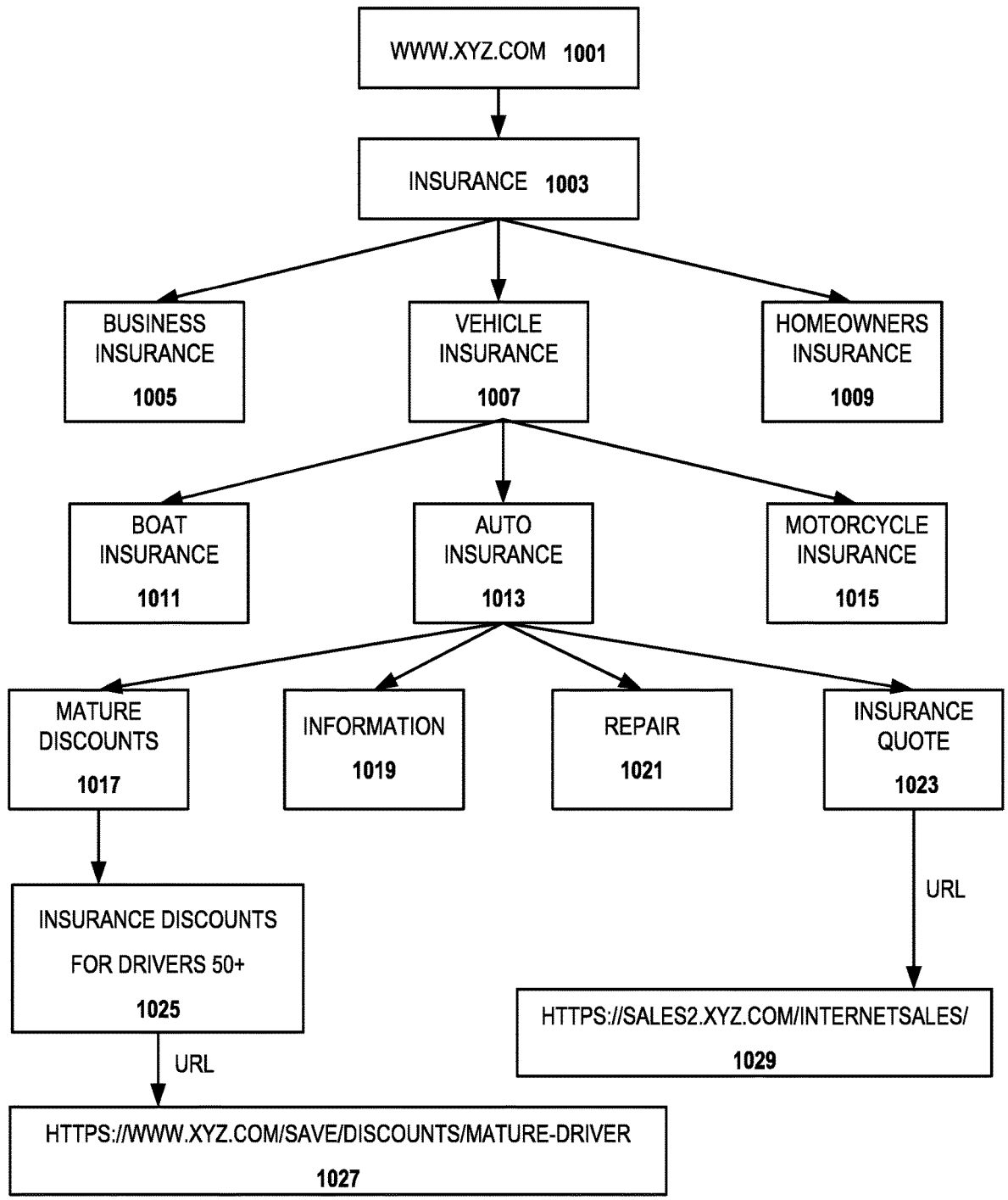
FIG. 10 is a flow diagram of user interaction with a conversational interface showing how the knowledge graph is used to answer user questions by traversing the knowledge graph according to an embodiment of the invention.

FIG. 10 is a flow diagram of user interaction with a conversational interface showing how the knowledge graph is used to answer user questions by traversing and querying the knowledge graph according to an embodiment of the invention. Consider the following dialog between a user and the conversational interface:

(1) User: I want insurance.
(2) System: What kind of insurance? Business, Vehicle or Homeowners?
(3) User: I want vehicle insurance.
(4) System: What kind of vehicle insurance? Auto insurance, boat insurance or motorcycle insurance?
(5) User: Auto
(6) System: Here's the link for an auto insurance quote—https://sales2.xyz.com/internetsales/?execution=elsl&pg=iSnapCustomer. I can help you with the form if you want to provide answers here. Say 'YES' to start form filling or 'NO' to visit the URL.
(7) User: is there a discount for old people?
(8) System: Yes, we provide insurance discounts for drivers 50+. Please visit—https:www.xyz.com/save/discounts/mature-driver for more information.

Referring now to the knowledge graph depicted in FIG. 10 and the dialog above, the user enters the xyz.com web site. The user either starts the chat bot, or the chat bot starts automatically as the web site application notes the user presence browsing the web site for a predetermined time period. In response to the chat bot window, the user indicates (1) "I want insurance" as a natural language input. As indicated above, the conversational interface will parse the semantic meaning of the user input and determine the searchable entities in the input, e.g., "insurance". A search in the knowledge graph will locate the insurance node 1003 and also the related nodes business insurance 1005, vehicle insurance 1007 and homeowner's insurance 1009. Thus, the conversational interface needs for the user to be more specific in the type of insurance, and generates the system response (2) "What kind of insurance? Business, Vehicle or Homeowners?" using the information in the knowledge graph and the rules for creating the system response.

The user responds (3) "I want vehicle insurance". The conversational interface parses the semantic meaning and determines the searchable entity is "vehicle insurance". Using that information as well as context data from the dialog log and dialog state from the persistent layer, the interface will progress to the vehicle insurance node and find the related nodes boat insurance 1011, auto insurance 1013 and motorcycle insurance 1015. Again, the interface determines that it needs the user to be more specific and generates the system response (4) "What kind of vehicle insurance? Auto insurance, boat insurance or motorcycle insurance?".

The user responds (5) "Auto" and based on the semantic meaning, the interface will progress to the auto insurance node 1013. Here, there are rules for the conversational interface to return the insurance quote link 1023 and URL information 1029 in system response (6). In response to the user query (7), the interface determines that the user is looking for insurance discounts for older people by the semantic meaning of the query. The best node from the auto insurance node 1013 is the mature discounts node 1017 which includes the path to nodes 1025 and 1027 from which the conversational interface formulates the system response (8).

The present invention has many advantages over the prior art. The Implicit Dialog system represents its conversation flows in respective data model clusters, e.g., the knowledge graph DB, the FAQ DB or the relational DB. In preferred embodiments, the data models are updated continuously by the conversation flows between the user(s) and conversational system as updated by the real time dialog log. Periodically, updates to the web site result in new inputs to the deep learning algorithm which result in updates to the data model clusters. Therefore, the implicit dialog system is considered a self-adaptive system.

The invention allows rapid development of ontology/schema based on automatically identified relevant schema. A new data representation adds a conversation overlay on the top of the application which is targeted to be made conversational. For example, to make a website conversational, embodiments of the invention extract and preserve the organization of existing web schema and business logic to assemble a plurality of databases. A hybrid approach is used for triple extraction wherein each data element occurs in a pair (data-value, location/schema path/index) and the process of triple creation is based on pair-wise data (e.g., value, location of graph (schema path)).

In the semantic matching process, any retrieved entities and relations from user input are mapped to a finite number of searchable graph nodes, edges, and attributes in a knowledge graph, in a RDB table with column names, or in an indexed dialog question answer pairs. A deep learning trained semantic matcher is used with a domain-dependent model of synonyms and antonyms. In embodiments of the invention, a semantic matcher is machine trained using domain dependent training data. This domain dependent training allows the semantic matcher to better understand user input and map it to specific nodes in the knowledge sources created for the conversational system. In a preferred embodiment, the synonym-antonym model would be trained as part of the end-to-end optimization of the question answering system. Further, deep learning techniques are used for semantic matching of the content in the user input to the knowledge graph, for entities/nodes (word embedding), for sentence and paragraph/content matching (based on approaches to sentence similarity matching). Long Short-Term Memory (LSTM) neural networks, or other neural networks such as the seq2seq model, are used as the encoder-decoder model. The mapping is used to take a user input and create a most likely dynamic logic representation in the conversation data models to provide the system response.

A dynamic logic representation is dynamically identified via either a query operation or via a semantic parsing operation after a user input is given, and the dynamic logic representation has components which are needed for a system response or dialog action. The dialog action is chosen from a set of possible system responses such as an information prompt, an action URL, an on-line form killing action, a template action (sub-graph, or DB table structure) or a disambiguation prompt.

The Implicit Dialog system supports self-adaptive processing of conversation flows. After a conversational interface as described is deployed online, it can automatically adapt its conversation flows to its actual experience with new user conversation scenarios by leveraging a Deep Learning trained restraint model, trained both with the original domain corpus and as well as any newly recorded user conversation logs. In embodiments of the invention, it also provides a context aware update of the knowledge bases by automatically identifying the changes of the web content on the target web site and examining if the changes affect the knowledge structures and dialog policy of the conversation interface. Information extracted from the website will be tagged with a system date and time, when the information was extracted, processed and added to the knowledge graph. The date and time allows to capture if the information stored in the knowledge graph is recent or not.

In preferred embodiments, the conversational interface predicts the user intent based the entities in the user query, on conversational history with the current or prior users (including the prior system responses selected) and past and current web content.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

What is claimed:

1. A method for presenting a user interface for a conversational system comprising:
   receiving a user input produced in a dialog between a user and the conversational system, the user input in a natural language;
   using a domain trained semantic matcher to determine a set of entities and a user intent from the user input, the domain trained semantic matcher trained according to tasks of a target web site;
   generating a plurality of queries from the set of entities and the user intent from the user input, each of the queries to selected ones of a plurality of knowledge sources, the knowledge sources created from domain specific knowledge, the domain specific knowledge related to tasks of the target web site;
   ranking results from the plurality of queries based on the domain specific knowledge; and
   presenting a system response in the dialog based on at least a highest ranked result from the plurality of knowledge sources.

2. The method as recited in claim 1, wherein the plurality of queries are generated including a first query to a first knowledge source and a second query to a second knowledge source in the plurality of knowledge sources and a result from the first knowledge source to the first query has a higher confidence score than a result from the second knowledge source to the second query.

3. The method as recited in claim 2, wherein the system response is generated based on the result from the first knowledge source.

4. The method as recited in claim 1, wherein the plurality of queries are generated including a first query to a first knowledge source and a second query to a second knowledge source in the plurality of knowledge sources and a result from the first knowledge source to the first query is used to generate a first part of the system response and a result from the second knowledge source to the second query is used to generate a second part of the system response.

5. The method as recited in claim 1, further comprising generating the system response with a natural language process from the highest ranked result from the plurality of knowledge sources.

6. The method as recited in claim 5, further comprising:
   generating one or more queries to an external knowledge source in addition to the plurality of knowledge sources; and
   using a result from the one or more queries to the external knowledge source to generate the system response in the dialog.

7. The method as recited in claim 1, further comprising updating selected ones of the plurality of knowledge sources based on conversational history in the dialog.

8. The method as recited in claim 1, wherein the user intent is determined based on conversational history between the user and the conversational system.

9. Apparatus, comprising:
   a processor;
   computer memory holding computer program instructions executed by the processor for presenting a user interface for a conversational system, the computer program instructions comprising:
   program code, operative to receive a user input produced in a dialog between a user and the conversational system, the user input in a natural language;
   program code, operative to use a domain trained semantic matcher to determine a set of entities and a user intent from the user input, the domain trained semantic matcher trained according to tasks of a target web site;
   program code, operative to generate a plurality of queries from the set of entities and the user intent from the user input, each of the queries to selected ones of a plurality of knowledge sources, the knowledge sources created from domain specific knowledge, the domain specific knowledge related to tasks of the target web site;
   program code, operative to rank results from the plurality of queries based on the domain specific knowledge; and
   program code, operative to present a system response in the dialog based on at least a highest ranked result from the plurality of knowledge sources.

10. The apparatus as recited in claim 9, wherein the plurality of queries are generated including a first query to a first knowledge source and a second query to a second knowledge source in the plurality of knowledge sources and a result from the first knowledge source to the first query has a higher confidence score than a result from the second knowledge source to the second query.

11. The apparatus as recited in claim 10, further comprising program code, operative to generate the system response based on the result from the first knowledge source.

12. The apparatus as recited in claim 9, wherein the plurality of queries are generated including a first query to a first knowledge source and a second query to a second knowledge source in the plurality of knowledge sources and a result from the first knowledge source to the first query is used to generate a first part of the system response and a result from the second knowledge source to the second query is used to generate a second part of the system response.

13. The apparatus as recited in claim 9, further comprising program code, operative to generate the system response with a natural language process from the highest ranked result from the plurality of knowledge sources.

14. The apparatus as recited in claim 13, further comprising:
   program code, operative to generate one or more queries to an external knowledge source in addition to the plurality of knowledge sources; and
   program code, operative to use a result from the one or more queries to the external knowledge source to generate the system response in the dialog.

15. A computer program product in a non-transitory computer readable medium for use in a data processing system, the computer program product holding computer program instructions executed by the data processing system for presenting a user interface for a conversational system, the computer program instructions comprising:
   program code, operative to receive a user input produced in a dialog between a user and the conversational system, the user input in a natural language;
   program code, operative to use a domain trained semantic matcher to determine a set of entities and a user intent from the user input, the domain trained semantic matcher trained according to tasks of a target web site;
   program code, operative to generate one or more a plurality of queries from the set of entities and the user intent from the user input, each of the queries to selected ones of a plurality of knowledge sources, the knowledge sources created from domain specific knowledge, the domain specific knowledge related to tasks of the target web site;
   program code, operative to rank results from the plurality of queries based on the domain specific knowledge; and
   program code, operative to present a system response in the dialog based on at least a highest ranked result from the plurality of knowledge sources.

16. The computer program product as recited in claim 15, wherein the plurality of queries are generated including a first query to a first knowledge source and a second query to a second knowledge source in the plurality of knowledge sources and a result from the first knowledge source to the first query has a higher confidence score than a result from the second knowledge source to the second query.

17. The computer program product as recited in claim 16, further comprising program code, operative to generate the system response based on the result from the first knowledge source.

18. The computer program product as recited in claim 15, wherein the plurality of queries are generated including a first query to a first knowledge source and a second query to a second knowledge source in the plurality of knowledge sources and a result from the first knowledge source to the first query is used to generate a first part of the system response and a result from the second knowledge source to the second query is used to generate a second part of the system response.

19. The computer program product as recited in claim 15, further comprising program code, operative to generate the system response with a natural language process from the highest ranked result from the plurality of knowledge sources.

20. The computer program product as recited in claim 19, further comprising:
   program code, operative to generate one or more queries to an external knowledge source in addition to the plurality of knowledge sources; and
   program code, operative to use a result from the one or more queries to the external knowledge source to generate the system response in the dialog.

* * * * *